United States Patent Office 3,190,929
Patented June 22, 1965

3,190,929
METHOD OF PRODUCTION OF ALKYNOLS
Raymond A. Lynch, Sacramento, Calif., assignor to The Dow Chemical Company, Midland, Mich., a corporation of Delaware
No Drawing. Filed Dec. 27, 1960, Ser. No. 78,281
6 Claims. (Cl. 260—632)

This application is a continuation-in-part of my copending application Serial No. 784,874, filed January 5, 1959, now abandoned.

The present invention relates to a new and useful method for the production of alkynols and is more particularly concerned with a new and useful method for the preparation of alkynols employing acetylenic hydrocarbons and alkylene oxides.

Various methods have been employed to prepare alkynols such as the reaction of an aldehyde or ketone with acetylenic hydrocarbons in the liquid phase in the presence of heavy metal catalysts (Reppe et al., U.S. Patent Nos. 2,232,867 and 2,300,969, and Hecht, U.S. Patent No. 2,768,215). While these processes are very useful they present some problems in that suitable starting products are not readily available.

Therefore, an object of the present invention is to provide a process which utilizes only readily available starting products to prepare alkynols.

It has now been found that an acetylenic hydrocarbon will react with a 1,2-alkylene oxide in the presence of a copper catalyst and an amine promoter. The reaction proceeds readily at temperatures of from between 100° and 200° C. and at pressures of from between 200 and 1000 pounds per square inch gauge pressure and preferably between about 500 and 800 pounds per square inch. Good results are obtained when the oxide is employed in an amount of from 1 to 5 moles per mole of hydrocarbon; the catalyst from 0.05 to 0.5 mole per mole of hydrocarbon; and the promoter from 0.01 to 0.1 mole per mole of acetylenic hydrocarbon.

Suitable acetylenic hydrocarbons and acetylene and the mono-substituted acetylenes (e.g., the alkyl, alkenyl, alkynyl and phenyl acetylenes) such as methylacetylene, ethylacetylene, propylacetylene, and the like, vinylacetylene, propenylacetylene, butenylacetylene, propynylacetylene, butynylacetylene, and phenylacetylene and the like. That is, substantially any acetylenic hydrocarbon having the formula

R—C≡CH wherein R represents hydrogen or a hydrocarbon radical can be employed in accordance with the present invention. It is to be understood that while any acetylenic compound having the above formula can be employed, the more useful compounds are those containing 2 to 10 or more carbon atoms in the hydrocarbon.

The 1,2-alkylene oxides which can be employed in accordance with the present invention are, the 1,2-alkylene oxides containing from 2 to 6 carbon atoms and their halogenated derivatives, as for example, 1,2-ethylene oxide, 1,2-propylene oxide, 1,2-butylene oxide, 3,3-dimethyl-1,2-propylene oxide, epichlorohydrin, epibromohydrin, 1,2-pentylene oxide, 1,2-hexylene oxide, and their isomers such as 3,3-dimethyl-1,2-pentylene oxide and the like. Thus, substantially any 1,2-alkylene oxide having the formula

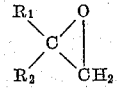

wherein $R_1$ and $R_2$ each independently represent hydrogen or an organic radical having a total of from 1 to 4 carbon atoms which can contain halogen can be employed.

Generally the reaction is carried out in the presence of a solvent such as dioxane or other inert organic solvent.

The copper catalysts which can be employed in accordance with the present invention are substantially any cuprous compound. Illustrative of these compounds are inorganic cuprous salts such as cuprous chloride, bromide, cyanide, oxide, sulfide, carbide, or the cuprous organic compounds such as the cuprous acetylides (i.e., cuprous acetylide, cuprous methylacetylide), cuprous isothiocyanate, the cuprous salts of organic acids, i.e. such as cuprous acetate, propionate, butyrate and the like.

Substantially any amine can be employed in accordance with the present invention as a promoter. Representative of amines which can be employed are the mono-, di-, and tri-aliphatic amines such as ethylamine, triethylamine, diethylamine, the propyl amines, the butylamines and the like, the cyclic and heterocyclic amines such as cyclohexylamine, cyclopentylamine, morpholine, piperazine, pyridine, piperidine, pyrrole, pyrrolidine and the like and the aromatic amines such as aniline, substituted anilines and the like. Thus, any amine free of other reactive groups can be employed whether it be acyclic or cyclic.

The following examples are illustrative of the present invention but are not to be construed as limiting:

*Example 1*

430 grams of ethylene oxide, 21 grams of triethylamine and 0.5 mole of cuprous acetylide were mixed with 1500 grams of anhydrous dioxane in a 4-liter rocking autoclave. The autoclave was then pressured with acetylene at atmospheric temperature to 50 p.s.i.g. (115 grams) then with nitrogen to bring the pressure to 100 p.s.i.g. and heated to 160° C. for 8 hours, during which the maximum pressure was 475 p.s.i.g.

The reaction product was filtered and the filtrate distilled to obtain 73 grams of 3-butyn-1-ol, 12 grams of 3-butyn-2-ol and 110 grams of mixed glycol ethers of the butynols.

*Example 2*

Two 1400 ml. rocking autoclaves were charged as follows: 109 grams of ethylene oxide, 7.3 grams of triethylamine, 43 grams of cuprous bromide and 600 ml. of anhydrous dioxane. The autoclaves were pressured first with acetylene at 50 p.s.i.g. (50 grams), then with nitrogen to bring the pressure to 100 p.s.i.g. and heated to 168° C. for 6½ hours during which time the pressure reached 475–485 p.s.i.g.

At the end of the reaction period the product was filtered and the solvent distilled off at atmospheric pressure.

The high boiling crude products were fractionated at reduced pressure and analyzed by infra-red and mass spectrometer.

Analysis showed 35.8 grams 3-butyn-1-ol, 28.3 grams of 3-butyn-2-ol and 28 grams of mixed glycol ethers of the butynols.

*Example 3*

A 330 ml. high pressure autoclave was charged with 237 grams of epichlorohydrin, 14.3 grams of CuBr and 3.6 grams of triethylamine. The autoclave was then pressured with acetylene at 100 p.s.i.g. (10 grams), then with nitrogen to bring the pressure to 200 p.s.i.g.; the vessel was heated to 160° C. for 6 hours during which time the pressure was 512–580 p.s.i.g.

At the end of the reaction period the bomb contents were filtered to obtain 193 grams of filtrate which analyzed as follows: 40 percent (weight) epichlorohydrin, 4.6 percent 4-hydroxy-5-chloro-1-pentyne with the balance being 1-bromo-3-chloro-2-propanol and polyepichlorohydrin.

I claim:

1. A process for the preparation of 3-butyn-1-ol which comprises reacting by contacting ethylene oxide and acetylene in a mole ratio of about 2 to 1, respectively, in the presence of a cuprous acetylide catalyst and a triethylamine promoter, at a temperature of from about 100° to about 200° C. and under superatmospheric pressure.

2. A process for the production of alkynols which comprises reacting by contacting at a temperature of from about 100° to about 200° C. under superatmospheric pressure a 1,2-alkylene oxide having from 2 to about 6 carbon atoms and selected from the group consisting of 1,2-alkylene oxides and bromo and chloro substituted 1,2-alkylene oxides, with an acetylenic hydrocarbon having the formula $RC \equiv CH$ wherein R represents a member selected from the group consisting of hydrogen and hydrocarbon radicals having from 2 to 10 carbon atoms, in the presence of a cuprous compound catalyst selected from the group consisting of cuprous chloride, bromide, cyanide, sulfide, carbide, acetylide, methyl acetylide, isothiocyanate, acetate, propionate, and butyrate, and an amine promoter.

3. A process for the production of alkynols which comprises reacting by contacting at a temperature from about 100° to about 200° C. and at a pressure of from about 200 to about 1000 pounds per square inch, a 1,2-alkylene oxide having from 2 to about 6 carbon atoms selected from the group consisting of 1,2-alkylene oxides and bromo and chloro substituted 1,2-alkylene oxides, with an acetylenic hydrocarbon having the formula $RC \equiv CH$ wherein R represents a member selected from the group consisting of hydrogen and hydrocarbon radicals, in the presence of a cuprous compound catalyst selected from the group consisting of cuprous chloride, bromide, cyanide, sulfide, carbide, acetylide, methyl acetylide, isothiocyanate, acetate, propionate, and butyrate, and a nitrogenous base promoter selected from the group consisting of mono-, di-, and trialiphatic amines, cyclic amines, heterocyclic amines and aromatic amines.

4. A process as set forth in claim 3 wherein the ratio of reactants is about 1 to 5 moles of oxide per mole of acetylenic hydrocarbon, the catalyst is employed in the amount of from 0.05 to 0.5 mole per mole of acetylenic hydrocarbon, and the promoter is employed in an amount of from 0.01 to 0.1 mole per mole of acetylenic hydrocarbon.

5. A process as set forth in claim 3 wherein the reactants are in contact for between six and eight hours.

6. A process for the production of alkynols which comprises reacting by contacting 1 mole of an acetylenic hydrocarbon having the formula $HC \equiv CR$ wherein R represents a member selected from the group consisting of hydrogen and hydrocarbon radicals, with from 1 to 5.0 moles of a 1,2-alkylene oxide having from 2 to 6 carbon atoms, selected from the group consisting of 1,2-alkylene oxides and bromo and chloro substituted 1,2-alkylene oxides, in the presence of from 0.05 to 0.5 mole of a cuprous compound catalyst selected from the group consisting of cuprous chloride, bromide, cyanide, sulfide, carbide, acetylide, methyl acetylide, isothiocyanate, acetate, propionate, and butyrate, and from 0.01 to 0.1 mole of a nitrogenous base promoter selected from the group consisting of mono-, di-, and trialiphatic amines, per mole of acetylene compound, at a temperature of from about 100° C. to about 200° C. and at a pressure of from 200 to 1000 pounds per square inch for from about 6 to 8 hours.

References Cited by the Examiner

UNITED STATES PATENTS

| 2,300,969 | 11/42 | Reppe et al. | 260—638 |
| 2,525,672 | 10/50 | Heilbron et al. | 260—632 |

FOREIGN PATENTS 544,221  4/42  Great Britain.

OTHER REFERENCES

Newman et al.: J. Am. Chem. Soc., vol. 71, pp. 1292–5 (1949).

LEON ZITVER, *Primary Examiner.*

CHARLES B. PARKER, *Examiner.*